July 15, 1952 — L. SCHROER — 2,603,183
NEST
Filed Aug. 14, 1950
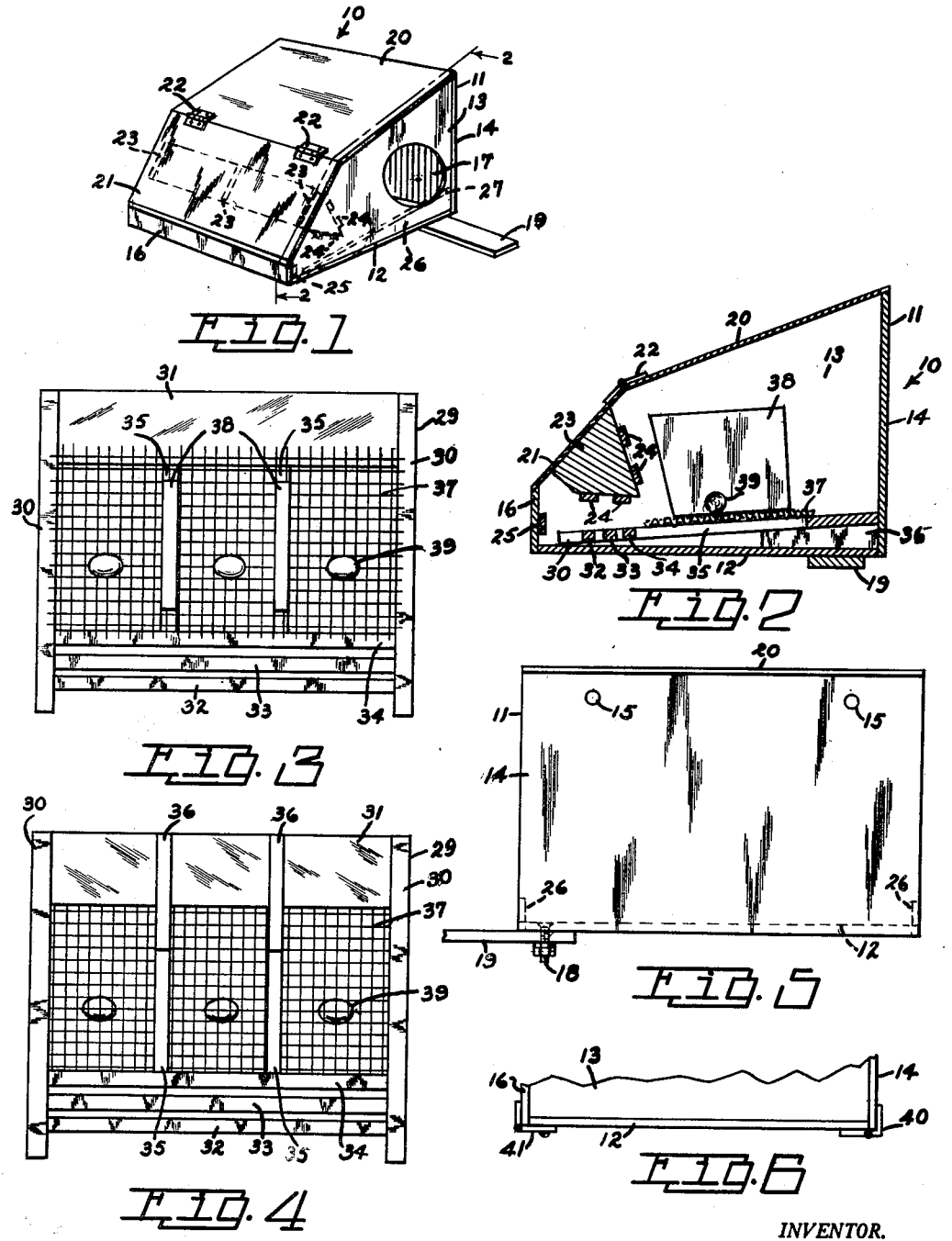
INVENTOR.
LEROY SCHROER
BY
J. B. Dickman, Jr.
ATTORNEY Patented July 15, 1952

2,603,183

UNITED STATES PATENT OFFICE 2,603,183

NEST

Leroy Schroer, New Knoxville, Ohio

Application August 14, 1950, Serial No. 179,207

1 Claim. (Cl. 119—48)

The present invention relates to nests and it has for one of its objects to provide a nest that is clean, sanitary, free of vermin, and one that insures clean eggs.

Another object of the present invention is the provision of a nest in which eggs when laid will automatically roll away from a hen immediately upon the hen arising from the egg.

A still further object of the present invention is the provision of means for preventing eggs from breaking when they roll away from a hen.

A still further object of the present invention is the provision of detachable bed means, or nest means.

A still further object of the present invention is the provision of means on the detachable means for enticing a hen.

A still further object of the present invention is the provision of means that prevents the nest from becoming dirty.

A still further object of the present invention is the provision of means for breaking the momentum of a rolling egg.

Other and more specific objects of the present invention will become apparent as the details thereof are described, having reference to the accompanying drawing, wherein:

Figure 1 is a perspective view of the device on a reduced scale.

Figure 2 is a sectional view taken on line 2—2 of Figure 1.

Figure 3 is a top plan view of the removable floor rack.

Figure 4 is a bottom plan view of the floor rack.

Figure 5 is a rear elevational view of the device, and

Figure 6 is a fragmentary side elevational view of the device and showing the hingedly mounted floor.

The old method of providing a housing with straw is objectional for many reasons. In hot weather the straw becomes infested with vermin which in time affects the hen to such an extent that it curtails her egg laying. The straw nest becomes fouled, which causes the eggs to become dirty. With a straw nest an egg laid by a hen remains in the nest unless removed immediately. The next hen that comes to the nest to lay will lay on the egg previously laid and due to her body heat will heat the egg first laid. In the course of a day if the eggs are not collected the eggs lose their freshness due to the heat that has been transmitted by the various hens. It is therefore of the greatest importance in order to have fresh eggs to provide a nest in which the eggs will automatically remove themselves after being laid.

Referring to the drawing, the numeral 10 represents the nest and it comprises a housing 11 that may be made of metal or wood. The housing comprises a floor 12, side members 13, a back 14 having apertures 15 for engaging hooks or pins for supporting the housing above the floor of a hennery, and a front member 16. One of the side members 13 is provided with an opening 17 for ingress and egress of hens, and below the opening 17 and pivotally mounted to the floor 12 by a bolt 18 is a perch 19 that may be swung under the floor 12. The housing 11 is provided with a slanting roof 20 and a door 21 that is secured to the roof by hinges 22, the door being disposed at a sharp downwardly inclined angle. On the inside face of the door there is secured a longitudinal guard rail, and as indicated by the dotted lines in Figure 1, the guard rail may be solid or it may be made up of a plurality of blocks 23 that are secured to the door 21, the blocks being held in spaced relation by slats 24, the slats being in spaced relation. By providing blocks 23 and slats 24 air will circulate through the guard. To the inner face of the front member 16 there is secured a pad 25 that may be of sponge rubber or any other resilient material that will cushion an egg striking it. To the inner face of the side members 13 there is secured supports 26 having one edge 27 slanting.

Within the housing 11 there is provided a detachable frame 29 that comprises side elements 30, a wide back element 31 that serves as a walkway for hens, and elements 32, 33 and 34 that are in spaced relation to each other and serve as brake means for a rolling egg or eggs. Interposed between the side elements 30, back element 31 and element 34 are elements 35 that are in spaced relation. Secured to the bottom faces of elements 35 and to the back element 31 are supports 36 that are identical in shape with supports 26, the bottom face of the supports 36 engaging the floor 12 of the housing. The frame on its top face is provided with a reticulated material 37 that is secured to the frame by any suitable means. On the top face of elements 35 there is secured partitions 38 that divide the frame into compartments or nests. In each compartment or nest and secured to the reticulated material 37 are dummy eggs 39 that may be made of wood, plastic or other suitable material. In Figure 6, the floor 12 if desired may be provided with hinges 40 and a hasp 41, thus providing additional means for cleaning the housing by swinging the floor open. By providing the frame with the supports 36 the frame is disposed at a slight grade in the housing, thus causing the eggs to roll away from hens.

In placing the device in position for use, nails or hooks are placed in a side wall of a hennery in spaced relation to receive the apertures 15 in the housing 11. The nest is then supported by these hooks or nails and above the floor of a hennery. The perch 19 is then moved into position. A hen or hens will mount the perch, pass through the opening 17 and select one of the nests. When an egg has been laid and the hen arises, the egg will slowly move toward the front panel 16. During the downward moving of an egg, when it reaches the elements 32, 33 and 34, the momentum is slowed up due to the spaces between elements 32 and 33. The egg passing over these elements will strike the resilient element 25 where it will remain until gathered. By providing the top 20 sloping the hen is prevented from moving in a standing position toward the front of the housing. By providing the door sloping the hen is further prevented from moving toward the front of the housing. By providing the guard 23, the hen is prevented from moving forward to try and pull eggs that are at the face of the resilient element 25 back under them for nesting purpose. The supports 26 and 36 having one edge slanting serve a dual purpose, they support the frame in the housing off of the floor and give the frame a gradual incline so that eggs when laid will roll away from a hen. The provision of reticulated material on the frame allows air to circulate under a hen while laying an egg, and it also allows droppings to pass through and onto the floor. Due to the structure outlined a housing is provided that is clean and airy, eggs laid will always be fresh, the shell of the egg will always be clean, the egg will start to cool as it starts to roll away which is extremely important in maintaining the freshness of eggs; the hen will be free of vermin that is so prevalent where straw or similar material is used as a nest.

By providing the detachable or removable frame or sub-floor 29, the frame may be washed or disinfected and then replaced in the housing.

To gather eggs that have been laid, it is only necessary to lift the door 21 and gather the eggs along the face of the resilient element 25.

From the foregoing description when taken in connection with the accompanying drawing, the advantages of the construction and operation will be apparent to those skilled in the art to which the invention appertains, and I desire to have it understood that the device is merely illustrative and that such changes may be made within the scope of the claims hereto appended.

What is claimed is:

A nest comprising a housing having a door hingedly mounted thereon, a guard secured to said door, said guard comprising vertical blocks and horizontal slats, a removable sloping sub-floor in said housing, said sub-floor having horizontally disposed spaced braking strips across the lower end thereof.

LEROY SCHROER.

REFERENCES CITED

The following references are of record in the file of this patent:

UNITED STATES PATENTS

| Number | Name | Date |
|---|---|---|
| 1,892,235 | Esch | Dec. 27, 1932 |
| 2,122,349 | Miles | June 28, 1938 |
| 2,501,475 | Meuhlfeld | Mar. 21, 1950 |